United States Patent
Lee et al.

(10) Patent No.: US 10,361,421 B2
(45) Date of Patent: Jul. 23, 2019

(54) RECHARGEABLE BATTERY

(71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 335 days.

(21) Appl. No.: 14/838,311

(22) Filed: Aug. 27, 2015

(65) Prior Publication Data

US 2016/0254519 A1 Sep. 1, 2016

(30) Foreign Application Priority Data

Feb. 26, 2015 (KR) .................. 10-2015-0027328

(51) Int. Cl.
*H01M 2/34* (2006.01)
*H01M 2/12* (2006.01)
(Continued)

(52) U.S. Cl.
CPC .............. *H01M 2/345* (2013.01); *H01M 2/02* (2013.01); *H01M 2/0202* (2013.01);
(Continued)

(58) Field of Classification Search
CPC ......... H01M 10/0525; H01M 2200/20; H01M 2220/20; H01M 2220/30; H01M 2/02;
(Continued)

(56) References Cited

U.S. PATENT DOCUMENTS

| | | | | |
|---|---|---|---|---|
| 2010/0266879 A1* | 10/2010 | Byun | ............... | H01M 2/1235 429/53 |
| 2013/0115511 A1* | 5/2013 | Han | ............... | H01M 2/1241 429/208 |
| 2013/0266830 A1 | 10/2013 | Byun et al. | | |

FOREIGN PATENT DOCUMENTS

| | | |
|---|---|---|
| EP | 2226868 A1 | 9/2010 |
| EP | 2284932 A1 | 2/2011 |

(Continued)

OTHER PUBLICATIONS

EPO Extended Search Report dated Jun. 29, 2016, for corresponding European Patent Application No. 16157450.4 (8 pages).
(Continued)

*Primary Examiner* — Lingwen R Zeng
(74) *Attorney, Agent, or Firm* — Lewis Roca Rothgerber Christie LLP (57) ABSTRACT

A rechargeable battery includes: an electrode assembly having a first electrode and a second electrode; an electrode terminal electrically coupled to the electrode assembly; a case that receives the electrode assembly; a cap plate at an opening of the case that closes and seals the case, the cap plate having a vent hole to discharge an internal pressure of the case and having a vent plate that closes and seals the vent hole; and a short circuit member having one end electrically coupled to the electrode assembly and another end that extends along a direction toward the vent hole at the inside of the case. At least a portion of the short circuit member is modified to be drawn outside of the vent hole when the internal pressure is discharged.

8 Claims, 11 Drawing Sheets

(51) Int. Cl.
  *H01M 2/02* (2006.01)
  *H01M 2/04* (2006.01)
  *H01M 2/30* (2006.01)
  *H01M 10/0525* (2010.01)

(52) U.S. Cl.
  CPC .......... *H01M 2/0237* (2013.01); *H01M 2/04* (2013.01); *H01M 2/043* (2013.01); *H01M 2/0404* (2013.01); *H01M 2/1241* (2013.01); *H01M 2/1264* (2013.01); *H01M 2/30* (2013.01); *H01M 10/0525* (2013.01); *H01M 2200/20* (2013.01); *H01M 2220/20* (2013.01); *H01M 2220/30* (2013.01)

(58) Field of Classification Search
  CPC .... H01M 2/0202; H01M 2/0237; H01M 2/04; H01M 2/0404; H01M 2/043; H01M 2/1241; H01M 2/1264; H01M 2/30; H01M 2/345
  See application file for complete search history.

(56) References Cited

FOREIGN PATENT DOCUMENTS

| | | |
|---|---|---|
| EP | 2357685 B1 | 8/2011 |
| JP | 10-326610 | 12/1998 |
| KR | 10-0277652 B1 | 4/2001 |
| KR | 10-2013-0113802 A | 10/2013 |

OTHER PUBLICATIONS

Korean Patent Abstracts for Korean Publication No. 10-2000-0018606 A, Apr. 6, 2000 Corresponding to Korean Patent No. 10-0277652 B1, Apr. 2, 2001, 1 Page.

EPO Office Action dated Jul. 27, 2017, for corresponding European Patent Application No. 16157450.4 (5 pages).

European Office Action for Application No. 16 157 450.4, dated Apr. 16, 2019, 5 pages.

* cited by examiner

RECHARGEABLE BATTERY

CROSS-REFERENCE TO RELATED APPLICATION

This application claims priority to and the benefit of Korean Patent Application No. 10-2015-0027328 filed in the Korean Intellectual Property Office on Feb. 26, 2015, the entire contents of which are incorporated herein by reference.

BACKGROUND

1. Field

Embodiments of the described technology relate generally to a rechargeable battery that is short-circuited when a vent hole is opened.

2. Description of the Related Art

A rechargeable battery can be repeatedly charged and discharged, unlike a primary battery, which is not designed to be recharged. A rechargeable battery of a small capacity is used for a small portable electronic device such as a mobile phone or a laptop computer and a camcorder. A rechargeable battery of a large capacity is widely used as a power source for driving a motor of a hybrid vehicle.

In a representative rechargeable battery, a nickel-cadmium (Ni-Cd) battery, a nickel-hydrogen (Ni-MH) battery, a lithium (Li) battery, and a lithium ion (Li-ion) rechargeable battery exist. The Li-ion rechargeable battery has an operation voltage that is higher by about 3 times than those of a Ni-Cd battery and a Ni-MH battery that are widely used as a power source of portable electronic equipment. Further, due to a high energy density per unit weight, the Li-ion rechargeable battery has been widely used.

The rechargeable battery generally uses a lithium-based oxide as a positive electrode active material and a carbon material as a negative electrode active material. In general, the rechargeable battery is classified into a liquid electrolyte battery and a polymer electrolyte battery according to a kind of an electrolyte. A battery using a liquid electrolyte is referred to as a Li-ion battery, and a battery using a polymer electrolyte is referred to as a lithium polymer battery.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the described technology are directed toward providing a rechargeable battery in which a short circuit member that is short-circuited by contact with a cap plate is installed, when a vent hole is opened due to an abnormality of internal pressure.

An example embodiment provides a rechargeable battery including: an electrode assembly having a first electrode and a second electrode; an electrode terminal electrically coupled to the electrode assembly; a case that receives the electrode assembly; a cap plate at an opening of the case that closes and seals the case, the cap plate having a vent hole to discharge an internal pressure of the case and having a vent plate that closes and seals the vent hole; and a short circuit member having one end electrically coupled to the electrode assembly and another end that extends along a direction toward the vent hole at the inside of the case.

The short circuit member is modified to be drawn outside of the vent hole when the internal pressure is discharged.

The short circuit member may include a flexible material that contacts a surface of the cap plate by passing through the vent hole when the internal pressure is discharged.

The short circuit member may include a conductive material that electrically contacts an outer surface of the case when the vent hole is opened.

The short circuit member may be at the inside of the case and have a plate shape.

The short circuit member may have a width that is smaller than an opened width of the vent hole.

In the short circuit member, a thickness of a portion of the short circuit member that is drawn outside of the vent hole when the internal pressure is discharged may be smaller than that of a portion of the short circuit member that is coupled to the electrode assembly.

The short circuit member may have a recess portion at a portion that contacts the vent hole when the internal pressure is discharged.

The rechargeable battery may further include an insulating sheet attached to an internal surface of the cap plate facing the short circuit member.

According to an example embodiment, when an internal pressure of a rechargeable battery abnormally rises, a short circuit member is drawn outside of a cap plate with an internal pressure by passing through a vent hole. Here, a portion of the short circuit member electrically contacts a surface of the cap plate to be short-circuited and thus damage such as explosion of a rechargeable battery can be prevented from occurring (or a likelihood or amount of such damage may be reduced).

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

The subject matter of the present disclosure will be described more fully hereinafter with reference to the accompanying drawings, in which example embodiments are shown. As those skilled in the art would recognize, the described embodiments may be modified in various different ways, all without departing from the spirit or scope of the present invention. The drawings and description are to be regarded as illustrative in nature and not restrictive. Like reference numerals designate like elements throughout the specification. As used herein, the term "substantially," "about," and similar terms are used as terms of approximation and not as terms of degree, and are intended to account for the inherent deviations in measured or calculated values that would be recognized by those of ordinary skill in the art. Also, in the context of the present application, when a first element is referred to as being "on" a second element, it can be directly on the second element or be indirectly on the second element with one or more intervening elements interposed therebetween. Additionally, in the context of the present application, when a first element is referred to as being "coupled" or "connected" to a second element, it can be directly coupled or connected to the second element or be indirectly coupled or connected to the second element with one or more intervening elements interposed therebetween.

Figure 1:
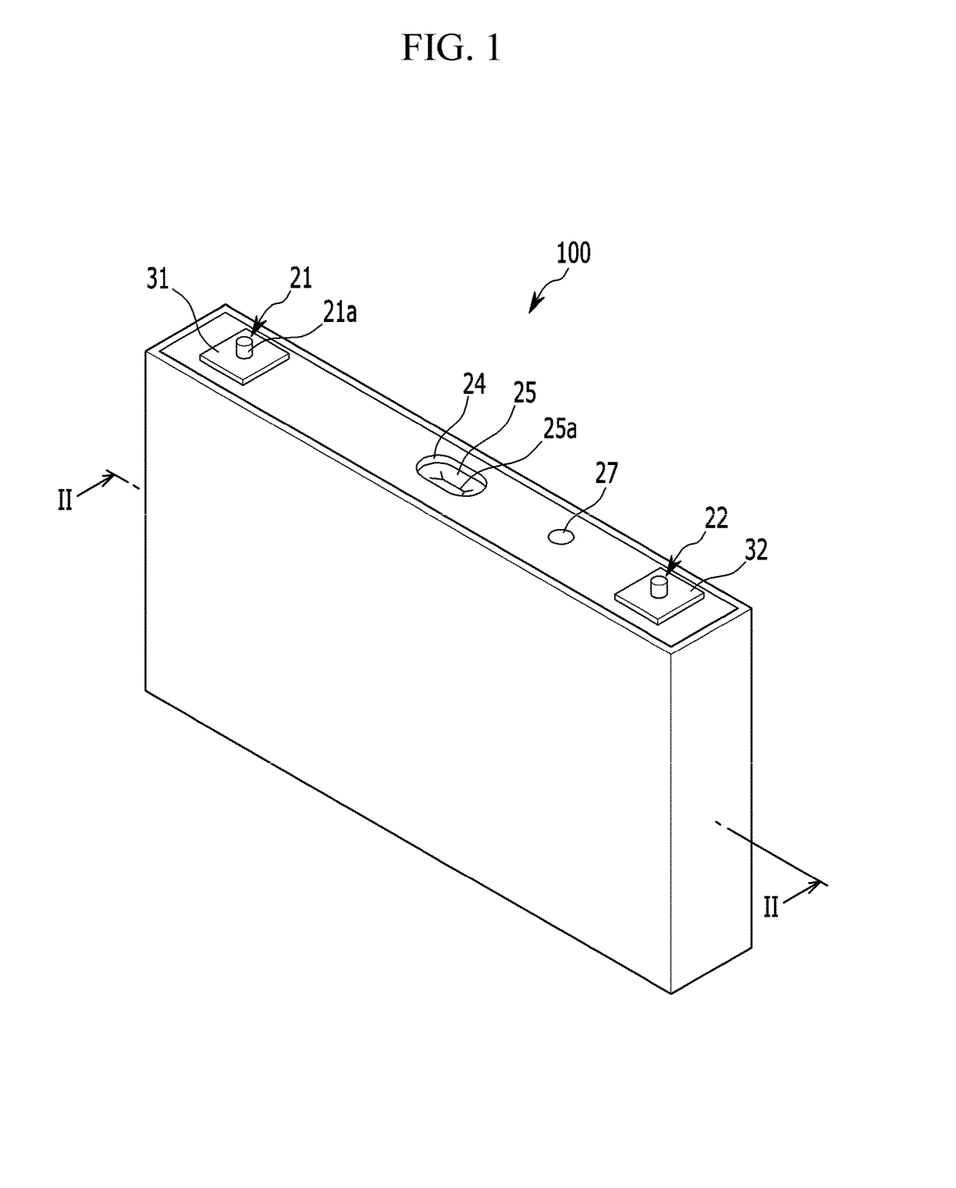
FIG. 1 is a perspective view illustrating a rechargeable battery according to a first example embodiment.
Figure 2:
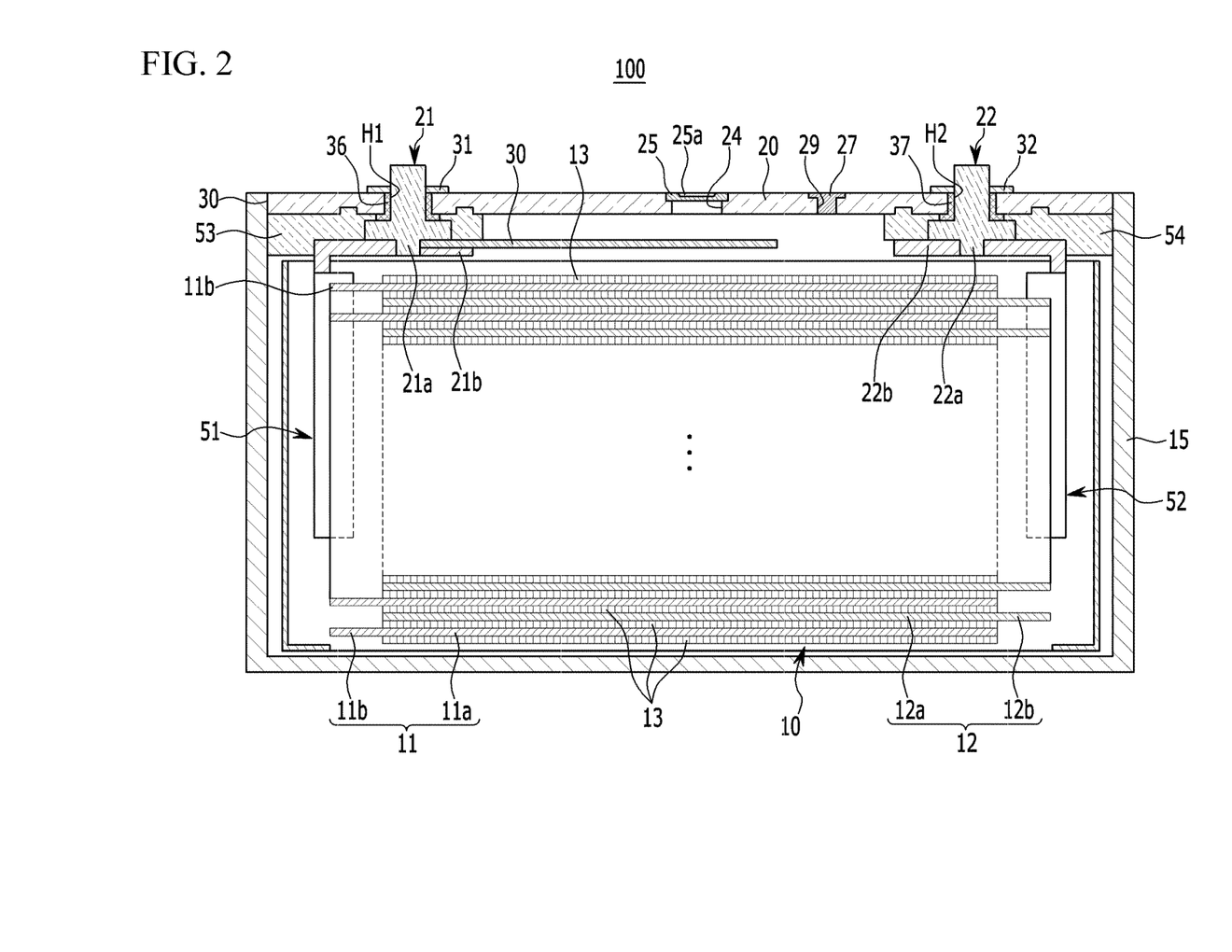
FIG. 2 is a cross-sectional view illustrating the rechargeable battery taken along line II-II of FIG. 1.
Figure 3:
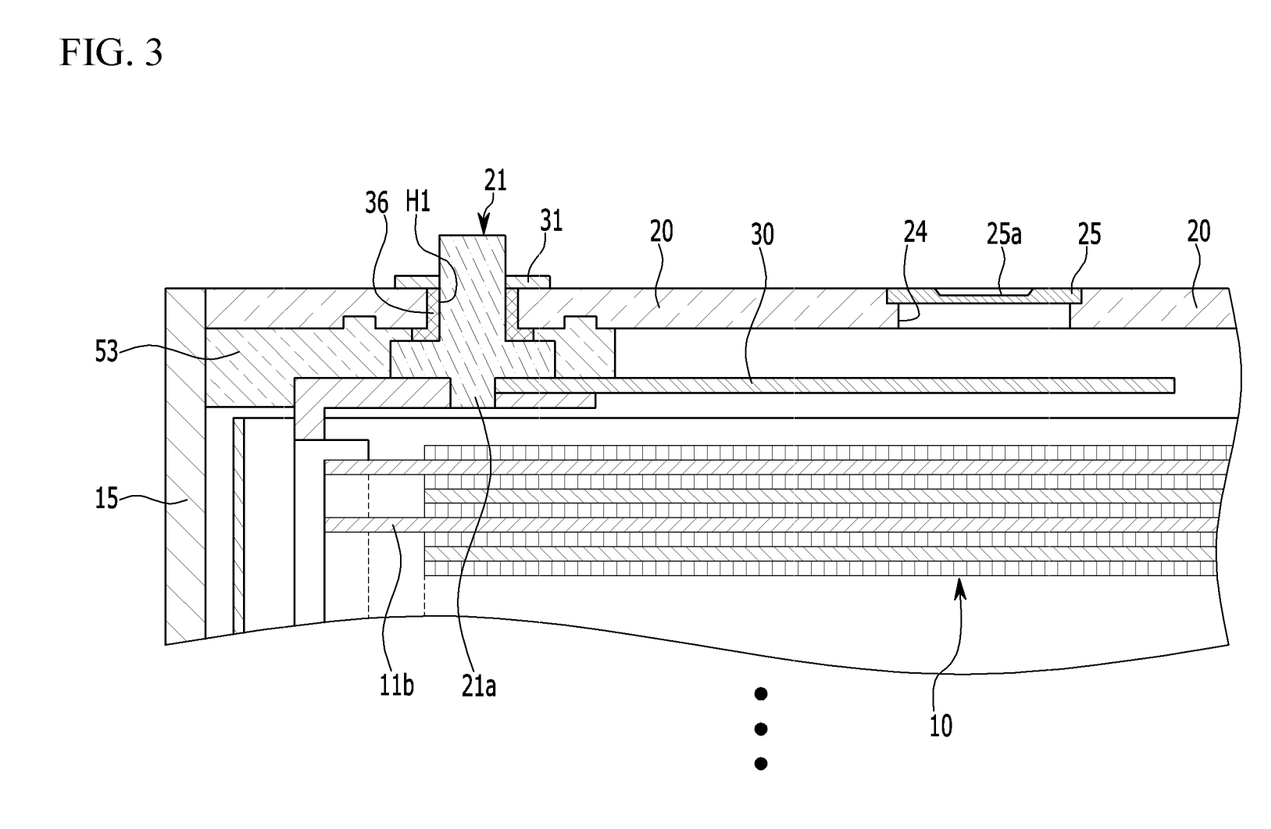
FIG. 3 is a partial cross-sectional view illustrating a state in which a short circuit member is installed within the rechargeable battery of FIG. 2.

FIG. 1 is a perspective view illustrating a rechargeable battery according to a first example embodiment, FIG. 2 is a cross-sectional view illustrating the rechargeable battery taken along line II-II of FIG. 1, and FIG. 3 is a partial cross-sectional view illustrating a state in which a short circuit member is installed in the rechargeable battery of FIG. 2.

As shown in FIGS. 1 to 3, a rechargeable battery 100 according to a first example embodiment includes an electrode assembly 10, electrode terminals 21 and 22 that are electrically coupled or connected to the electrode assembly 10, a case 15 that receives the electrode assembly 10, a cap plate 20 that has a vent hole 24 that is installed at or in an opening of the case 15 and through which an internal pressure of the case 15 is discharged, and a short circuit member 30 that has one end electrically coupled or connected to the electrode assembly 10 and the other end extended in a direction of the vent hole 24 at the inside or interior of the case 15 (e.g., the other end extends along a direction toward the vent hole at the inside of the case).

For example, the electrode assembly 10 is formed by disposing a first electrode (hereinafter referred to as a "negative electrode") 11 and a second electrode (hereinafter referred to as a "positive electrode") 12 at respective surfaces of a separator 13, which is an insulator, and by spirally-winding the negative electrode 11, the separator 13, and the positive electrode 12 to a jelly roll state.

The negative electrode 11 and the positive electrode 12 respectively include coated regions 11a and 12a at which a respective active material is applied to a current collector of a metal plate, and uncoated regions 11b and 12b, respectively, that are formed to have an exposed current collector because an active material is not applied thereto.

The uncoated region 11b of the negative electrode 11 is formed to be at an end portion of one side of the negative electrode 11 along the spiral-wound negative electrode 11. The uncoated region 12b of the positive electrode 12 is formed to be at an end portion of one side of the positive electrode 12 along the spiral-wound positive electrode 12. Therefore, the uncoated regions 11b and 12b are disposed at opposite ends of the electrode assembly 10.

For example, the case 15 is formed to have an approximate cuboid shape to set a space that houses the electrode assembly 10 and an electrolyte solution therein, and forms an opening that couples or connects the outside and an internal space at one surface of the cuboid. The opening allows or enables the electrode assembly 10 to be inserted into the case 15.

The cap plate 20 is installed at or in an opening of the case 15 to close and seal the case 15. In some embodiments, the case 15 and the cap plate 20 are made of aluminum to be welded to each other.

Further, the cap plate 20 has an electrolyte injection opening 29, a vent hole 24, and terminal holes H1 and H2. The electrolyte injection opening 29 allows or enables injection of an electrolyte solution into the case 15. After the electrolyte solution is injected, the electrolyte injection opening 29 is sealed by a seal stopper 27.

The vent hole 24 that is used to discharge internal pressure of the rechargeable battery 100 is closed and sealed with a vent plate 25. When an internal pressure of the rechargeable battery 100 reaches a set or predetermined pressure, the vent plate 25 is ruptured or cut out to open the vent hole 24. The vent plate 25 may have a notch groove 25a that induces rupture or cutout.

The electrode terminals 21 and 22 are formed to be a negative electrode terminal 21 and a positive electrode terminal 22, are installed in the terminal holes H1 and H2 of the cap plate 20, respectively, and are electrically coupled or connected to the electrode assembly 10.

In some embodiments, the negative electrode terminal 21 is electrically coupled or connected to the negative electrode 11 of the electrode assembly 10, and the positive electrode terminal 22 is electrically coupled or connected to the positive electrode 12 of the electrode assembly 10. Therefore, the electrode assembly 10 may be coupled to or drawn out to the outside of the case 15 through the negative electrode terminal 21 and the positive electrode terminal 22.

The short circuit member 30 is installed at the inside of the case 15. When an internal pressure of the case 15 is an abnormal pressure (e.g., a pressure above a set pressure), the short circuit member 30 is short-circuited to prevent damage to the rechargeable battery 100 (or to reduce a likelihood or amount of such damage), which will be described in more detail hereinafter.

Figure 4:
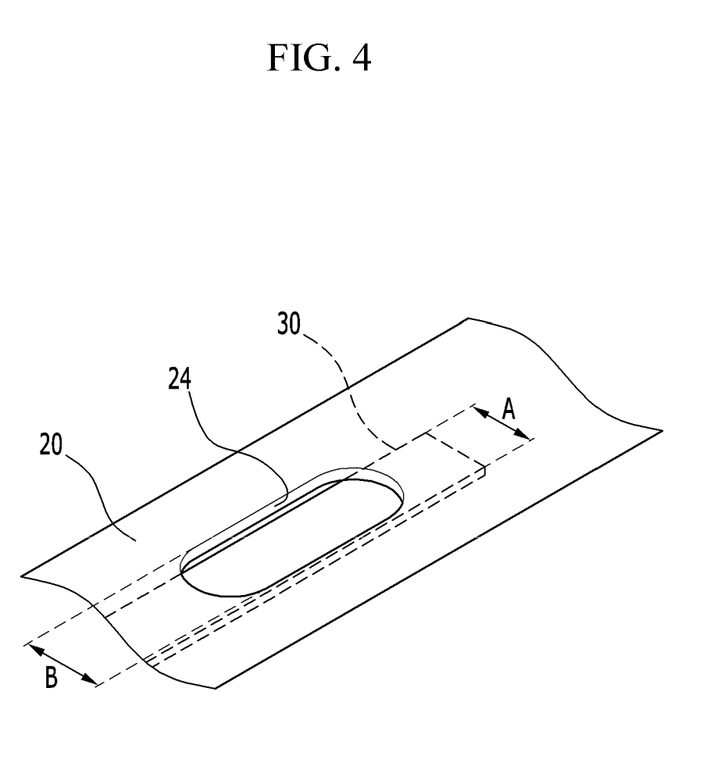
FIG. 4 is a partial perspective view illustrating a state in which a short circuit member is installed in a lower portion of a vent hole of the rechargeable battery of FIG. 1.

FIG. 4 is a partial perspective view illustrating a state in which a short circuit member is installed at or in a lower portion of a vent hole 24 of the rechargeable battery of FIG. 1.

As shown in FIGS. 2 and 3, one end of the short circuit member 30 is electrically coupled or connected to the electrode assembly 10 at the inside of the case 15. The other end of the short circuit member 30 may be extended to have a long length in a direction of the vent hole 24 at the inside of the case 15.

In some embodiments, the short circuit member 30 may be formed to have a long length crossing or spanning the vent hole 24 at a location that is separated from an inner wall surface of the cap plate 20 at the inside of the case 15.

In the short circuit member 30, a portion facing an inner wall surface of the cap plate 20 at the inside of the case 15 may be formed to have a plate shape of a flat plane. In some embodiments, the reason why the short circuit member 30 is formed to have a plate shape is that in a state in which internal pressure of the rechargeable battery 100 is abnormally raised (e.g., the internal pressure is raised above a set pressure), as a surface of the short circuit member 30 contact short-circuits with a surface of the cap plate 20 by passing through the vent hole 24, damage such as explosion is prevented from occurring in the rechargeable battery 100 (or a likelihood or amount of such damage may be reduced). For example, when the short circuit member 30 has a plate shape and the internal pressure of the rechargeable battery 100 rises above a set pressure, the short circuit member 30 is deflected toward the vent hole 24 to physically contact the surface of the cap plate 20 (e.g., at least a portion of the short circuit member 30 passes through the vent hole 24) to produce a short circuit, thereby reducing a likelihood or amount of damage to the rechargeable battery 100.

As shown in FIG. 4, a width A of the short circuit member 30 may be formed to have a smaller size than a width B (e.g., an opened width) of the vent hole 24 (e.g., a portion of the short circuit member 30 may have a width narrower than an opened width of the vent hole 24). This is to suitably or stably draw out the short circuit member 30 without or substantially without interference with the vent hole 24 in a process of drawing out the short circuit member 30 to the outside of the cap plate 20 through the vent hole 24.

In the rechargeable battery 100, when an internal pressure exceeds a set or predetermined pressure, the vent plate 25 is ruptured or cut out by the internal pressure and thus the vent hole 24 is opened. In a process in which an abnormal pressure (e.g., a pressure above a set pressure) within the rechargeable battery 100 is discharged through the vent hole 24, the short circuit member 30 is modified or deflected in a direction of the vent hole 24.

Figure 5:
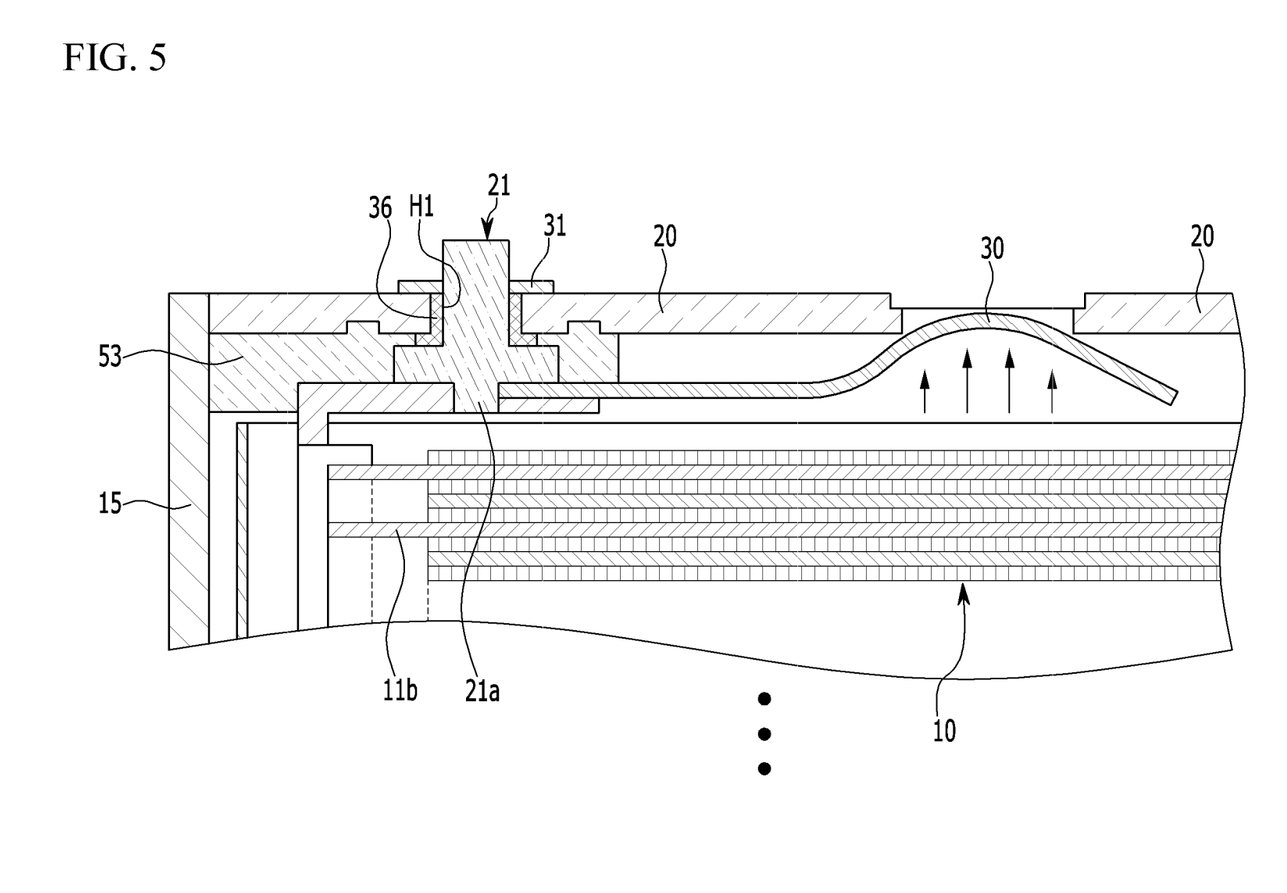
FIG. 5 is a cross-sectional view illustrating a state in which a short circuit member that is installed within a rechargeable battery is partially modified in a vent hole direction.

FIG. 5 is a cross-sectional view illustrating a state in which a short circuit member that is installed within a rechargeable battery is partially modified or deflected in a vent hole direction.

As shown in FIG. 5, in a process of discharging internal pressure of the rechargeable battery 100 through the vent hole 24 (as shown by the arrows), a portion of the short circuit member 30 may be modified while being bent in a direction of the vent hole 24. For this reason, the short circuit member 30 may be made of a flexible material that can be easily modified in a shape thereof by operation of an internal pressure of the rechargeable battery 100. In the present example embodiment, the short circuit member 30 may be formed to include a metal sheet shape including or made of a copper or aluminum material.

Figure 6:
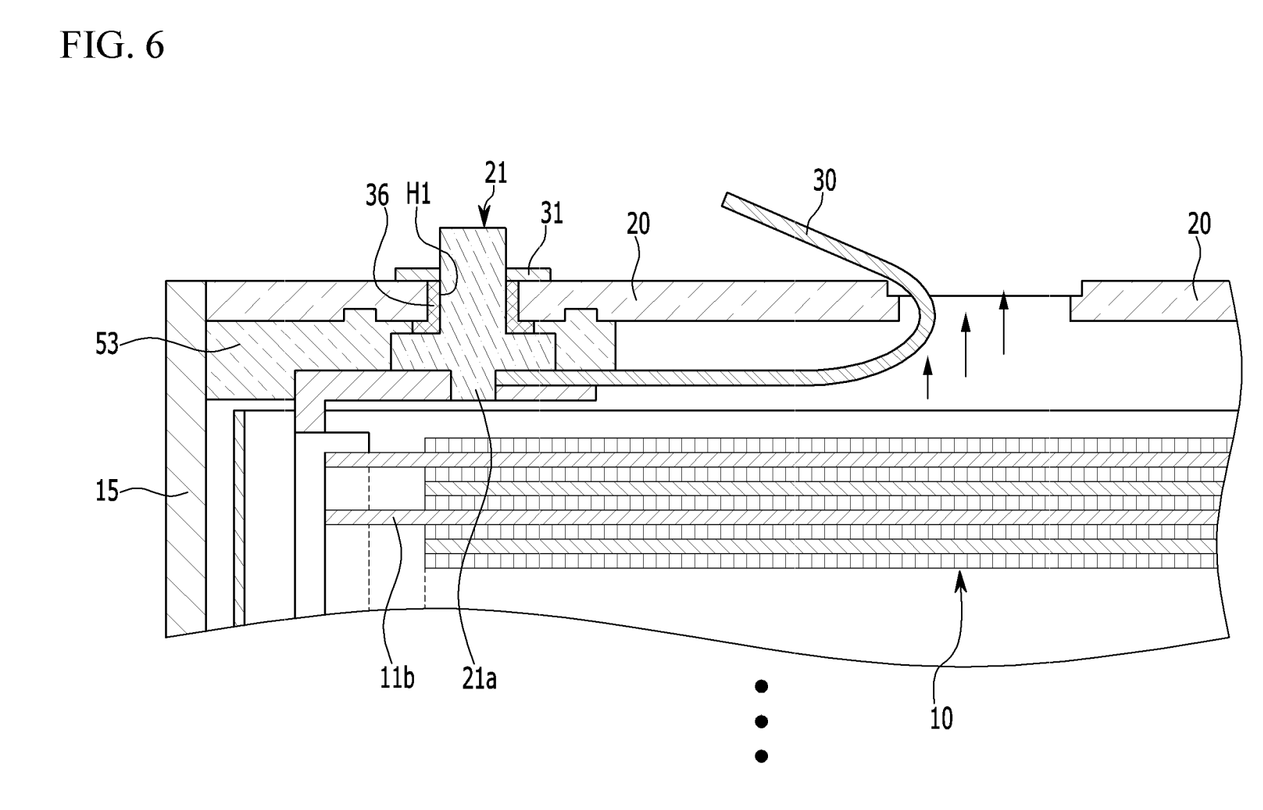
FIG. 6 is a partial cross-sectional view illustrating a state in which the short circuit member of FIG. 5 is modified to be drawn outside of a cap plate by passing through a vent hole.

FIG. 6 is a cross-sectional view illustrating a state in which the short circuit member of FIG. 5 is modified to be drawn outside of a vent hole.

As shown in FIG. 6, as internal pressure of the rechargeable battery 100 increases, when the vent hole 24 is opened, a shape of the short circuit member 30 is modified in a direction of the vent hole 24 by a discharge operation of the internal pressure (e.g., at least a portion of the short circuit member 30 is deflected to protrude through the vent hole 24).

Figure 7:
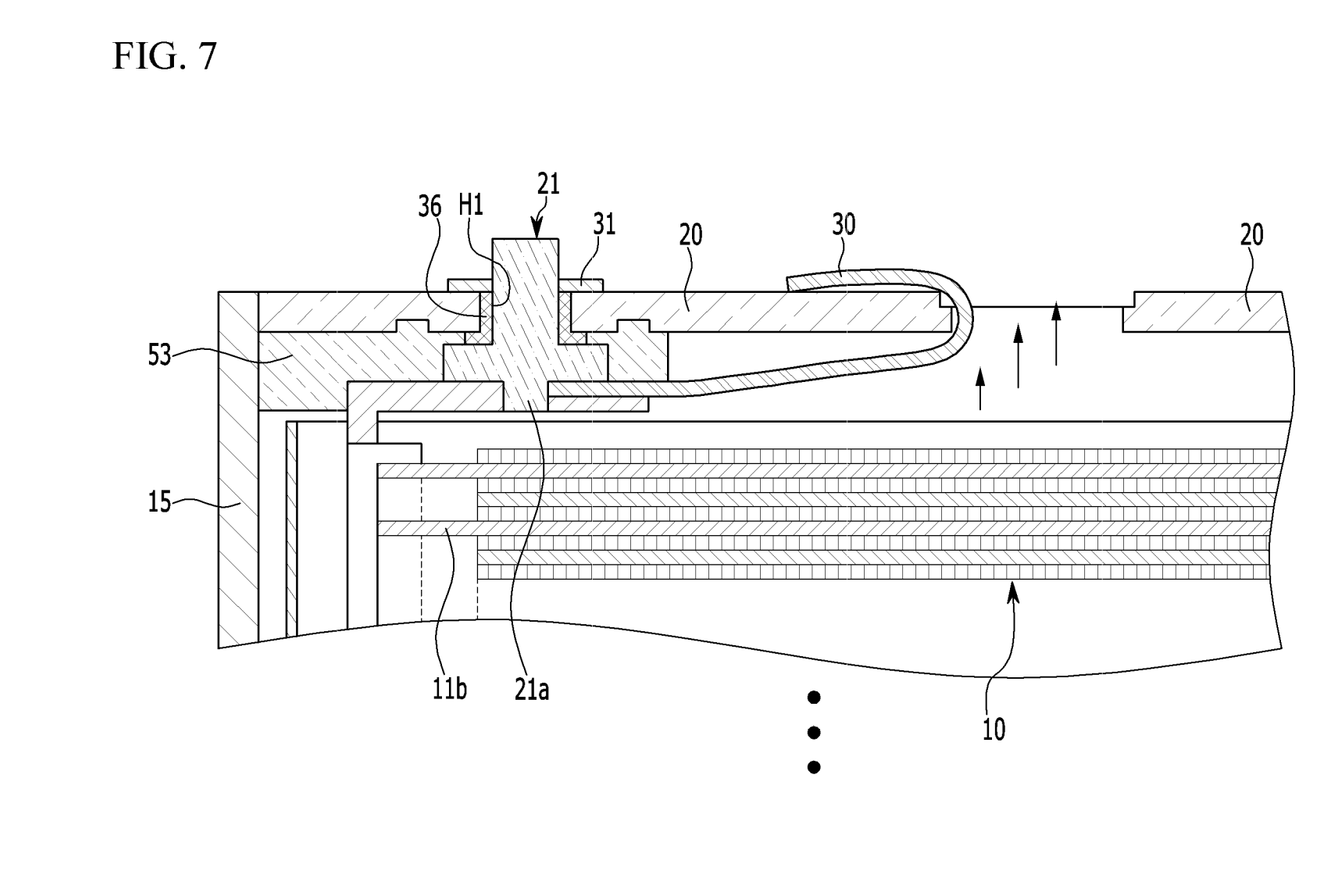
FIG. 7 is a partial cross-sectional view illustrating a state in which a short circuit member electrically contacts a surface of a cap plate in a state in which the short circuit member passes through a vent hole.
Figure 8:
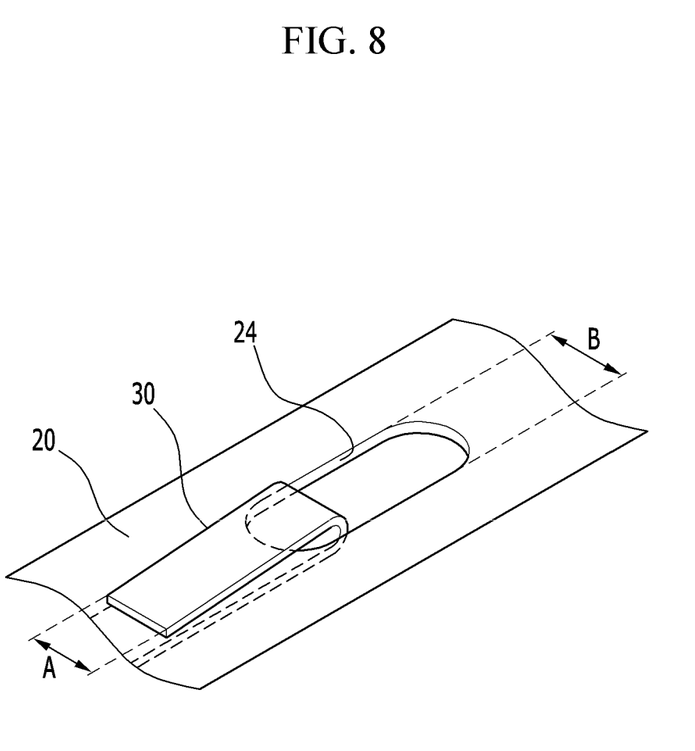
FIG. 8 is a partial perspective view illustrating a state in which the short circuit member of FIG. 7 contacts a cap plate.

FIG. 7 is a cross-sectional view illustrating a state in which a short circuit member of FIG. 6 is further modified to contact a surface of a cap plate, and FIG. 8 is a partial perspective view illustrating a state in which the short circuit member of FIG. 7 contacts the cap plate.

As shown in FIGS. 7 and 8, when the internal pressure is further discharged through the vent hole 24, in a state in which the short circuit member 30 is drawn outside through the vent hole 24, a portion of the short circuit member 30 may electrically contact a surface of the cap plate 20.

As described above, in the rechargeable battery 100 of the present example embodiment, when the internal pressure abnormally rises (e.g., rises above a set pressure), the increased internal pressure is discharged by passing through the vent hole 24. In this case, the short circuit member 30 is drawn outside of the cap plate 20 by the internal pressure by passing through the vent hole 24 and thus a portion of the short circuit member 30 electrically contacts a surface of the cap plate 20 to be short-circuited (to form a short-circuit). Therefore, when an excessive pressure increase occurs in the rechargeable battery 100, a short circuit operation occurs in the short circuit member 30 and thus damage such as explosion can be prevented from occurring (or a likelihood or amount of such damage may be reduced).

The electrode terminals 21 and 22 may include respective rivet terminals 21a and 22a that are installed in the terminal holes H1 and H2, respectively, of the cap plate 20 and that are electrically coupled or connected to the electrode assembly 10.

One end of each of the rivet terminals 21a and 22a is electrically coupled or connected to the electrode assembly 10 by welding at the inside of the case 15. The other end of each of the rivet terminal 21a and 22a may be protruded to the outside of the terminal holes H1 and H2, respectively.

A respective one of a negative electrode gasket 36 and a positive electrode gasket 37 are installed between a respective one of the rivet terminals 21a and 22a of the negative electrode terminal 21 and the positive electrode terminal 22 and a respective one of an inner surface of the terminal hole H1 and an inner surface of the terminal hole H2 of the cap plate 20 to seal and electrically insulate between the rivet terminals 21a and 22a of the negative electrode terminal 21 and the positive electrode terminal 22, respectively, and the cap plate 20.

A respective one of a negative electrode current collecting tab 51 and a positive electrode current collecting tab 52 electrically couple or connect a respective one of the negative electrode terminal 21 and the positive electrode terminal 22 to a respective one of the negative electrode 11 and the positive electrode 12 of the electrode assembly 10. In some embodiments, by coupling a respective one of a lower end portion of the negative electrode current collecting tab 51 and a lower end portion of the positive electrode current collecting tab 52 to a respective one of lower end portions of the rivet terminals 21a and 22a by caulking while the negative electrode current collecting tab 51 and the positive electrode current collecting tab 52 are supported by flanges 21b and 22b, respectively, the negative electrode current collecting tab 51 and the positive electrode current collecting tab 52 are coupled or connected to the lower end portions of the rivet terminals 21a and 22a, respectively.

Lower insulation members 53 and 54 are each installed between the negative electrode current collecting tab 51 and the positive electrode current collecting tab 52 and the cap plate 20 to electrically insulate the negative electrode current collecting tab 51 and the positive electrode current collecting tab 52 and the cap plate 20. Further, the lower insulation members 53 and 54 are coupled to the cap plate 20 at one side and enclose the negative electrode current collecting tab 51, the positive electrode current collecting tab 52, the rivet terminals 21a and 22a, and the flanges 21b and 22b at the other side, thereby stabilizing a coupling or connection structure thereof.

Upper insulating members 31 and 32 of the negative electrode terminal 21 and positive electrode terminal 22 electrically insulate between the negative electrode terminal 21 and the positive electrode terminal 22 and the cap plate 20.

Such upper insulating members 31 and 32 are interposed between the negative electrode terminal 21 and the positive electrode terminal 22 and the cap plate 20 to penetrate the rivet terminals 21a and 22a. Therefore, by caulking an upper end portion by coupling the upper insulating member 31 to the upper end portion of the rivet terminal 21a, the upper insulating member 31 and 32 may be coupled to the upper end portion of the rivet terminals 21a and 22a.

Figure 9:
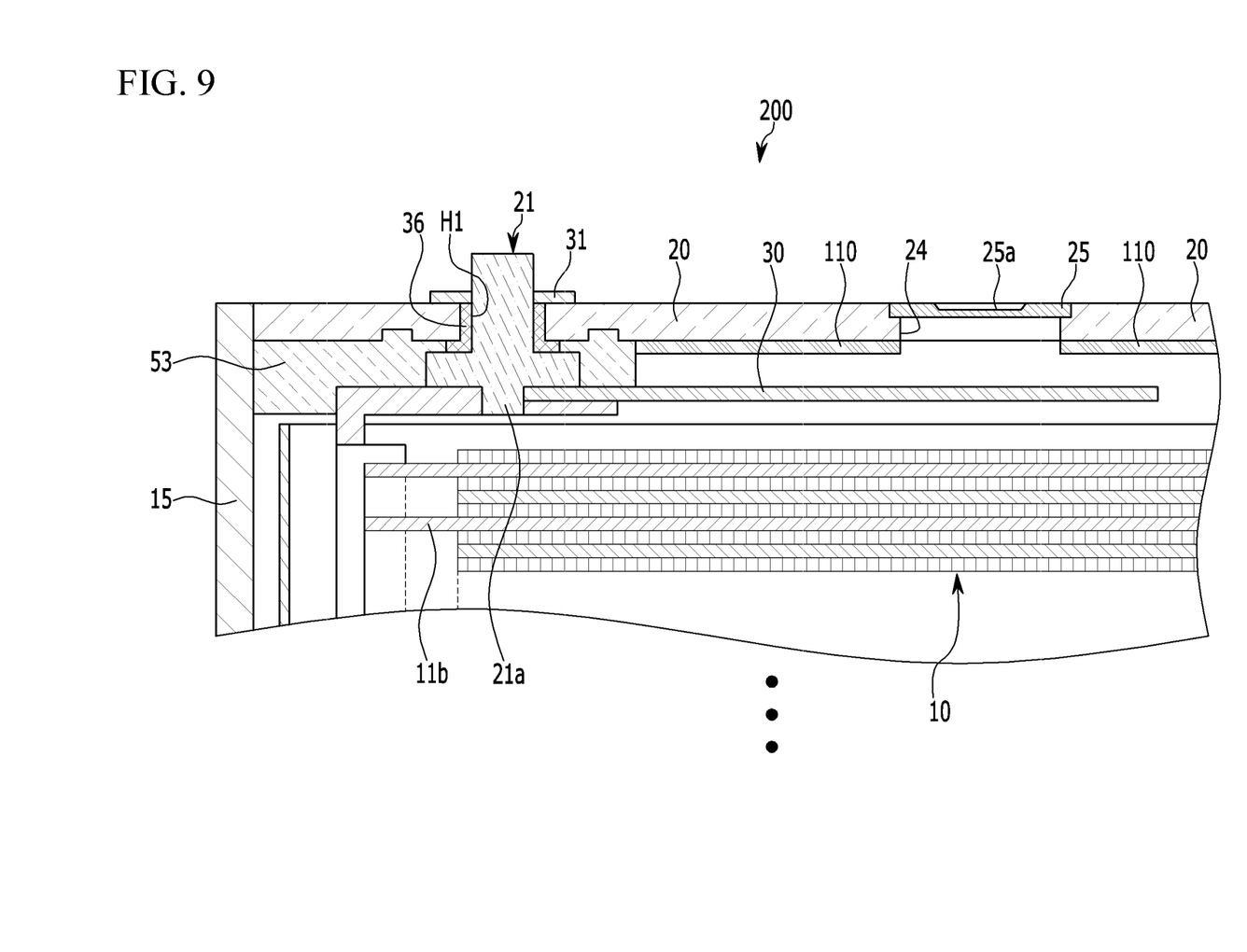
FIG. 9 is a partial cross-sectional view illustrating a rechargeable battery according to a second example embodiment.

FIG. 9 is a partial cross-sectional view illustrating a rechargeable battery according to a second example embodiment. The same reference numerals of FIGS. 1 to 8 indicate the same members having the same functions. Hereinafter, a detailed description of the same reference numerals will not be repeated.

As shown in FIG. 9, in a rechargeable battery 200 according to a second example embodiment, an insulating sheet 110 is attached to a surface of a cap plate 20 at the inside of a case 15.

At the inside of the case 15, as a short circuit member 30 abnormally contacts, in order to prevent a short circuit from occurring (or to reduce a likelihood or frequency of such a short circuit), the insulating sheet 110 may be attached to a surface of the cap plate 20. Therefore, even when an external force is applied to the rechargeable battery 200 or even when the rechargeable battery 200 is excessively shaken, by stopping the short circuit member 30 from abnormally contacting the cap plate 20, stability of the rechargeable battery 200 can be improved.

Figure 10:
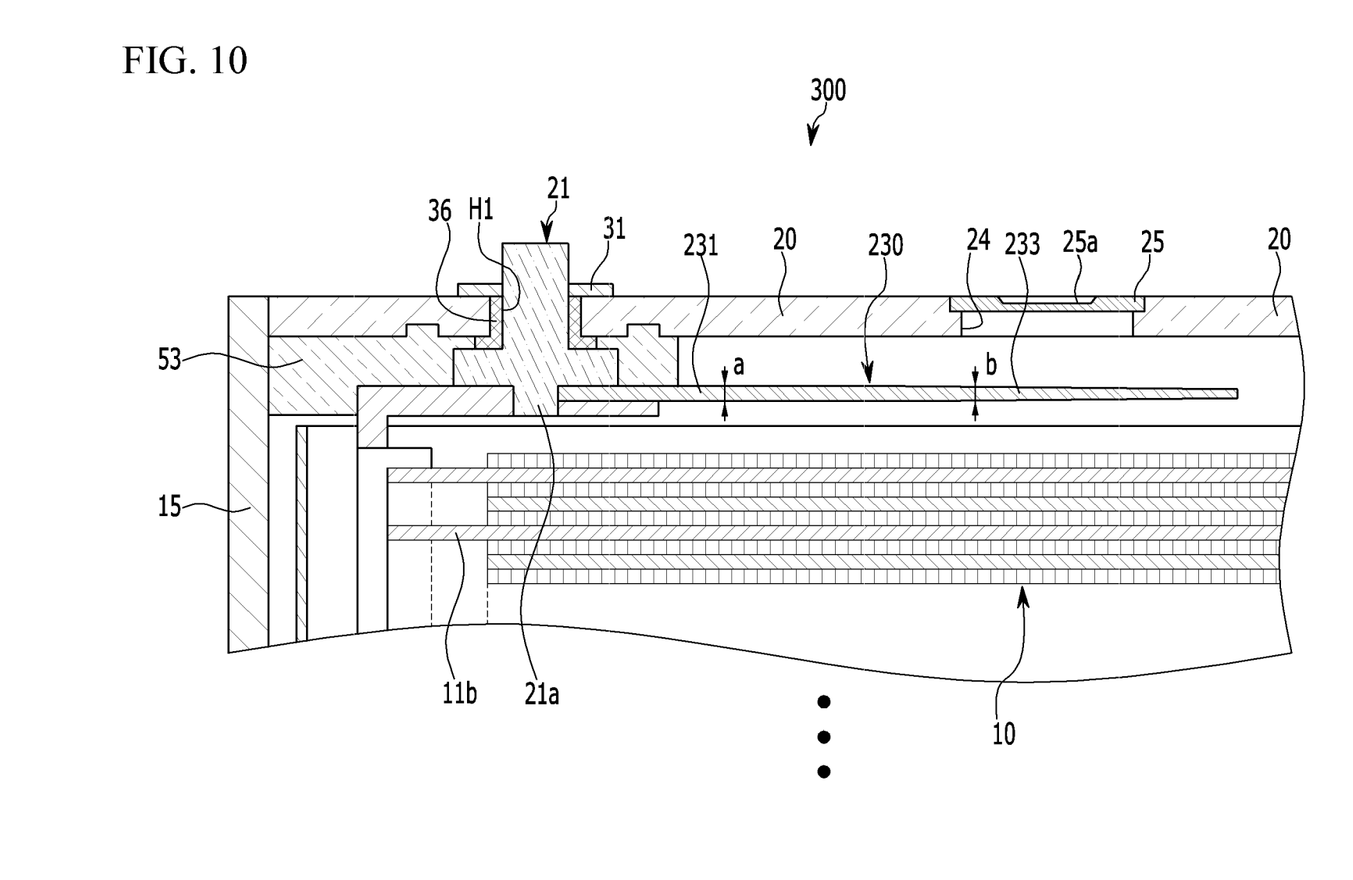
FIG. 10 is a partial cross-sectional view illustrating a rechargeable battery according to a third example embodiment.

FIG. 10 is a partial cross-sectional view illustrating a rechargeable battery according to a third example embodiment. The same reference numerals of FIGS. 1 to 9 indicate the same members with the same functions. Hereinafter, a detailed description of the same reference numerals will not be repeated.

As shown in FIG. 10, in a rechargeable battery 300 according to a third example embodiment, in a short circuit member 230, a thickness "b" of a first portion 233 near to or contacting an opened edge of a vent hole 24 is formed with a smaller thickness than a thickness "a" of a second portion 231 that is coupled or connected to an electrode assembly 10.

The second portion 231 of the short circuit member 230 is a portion that is coupled or connected from an end portion to the electrode assembly 10, and may be formed with a length portion of half or more of the entire length. Here, a thickness of the first portion 233 of the short circuit member 230 may be formed as half or more of a thickness of the second portion 231.

Therefore, in a process in which the short circuit member 230 is drawn outside of the vent hole 24, a shape change of the second portion 233 is more easily performed and thus the short circuit member 230 may be stably drawn outside of the vent hole 24.

Figure 11:
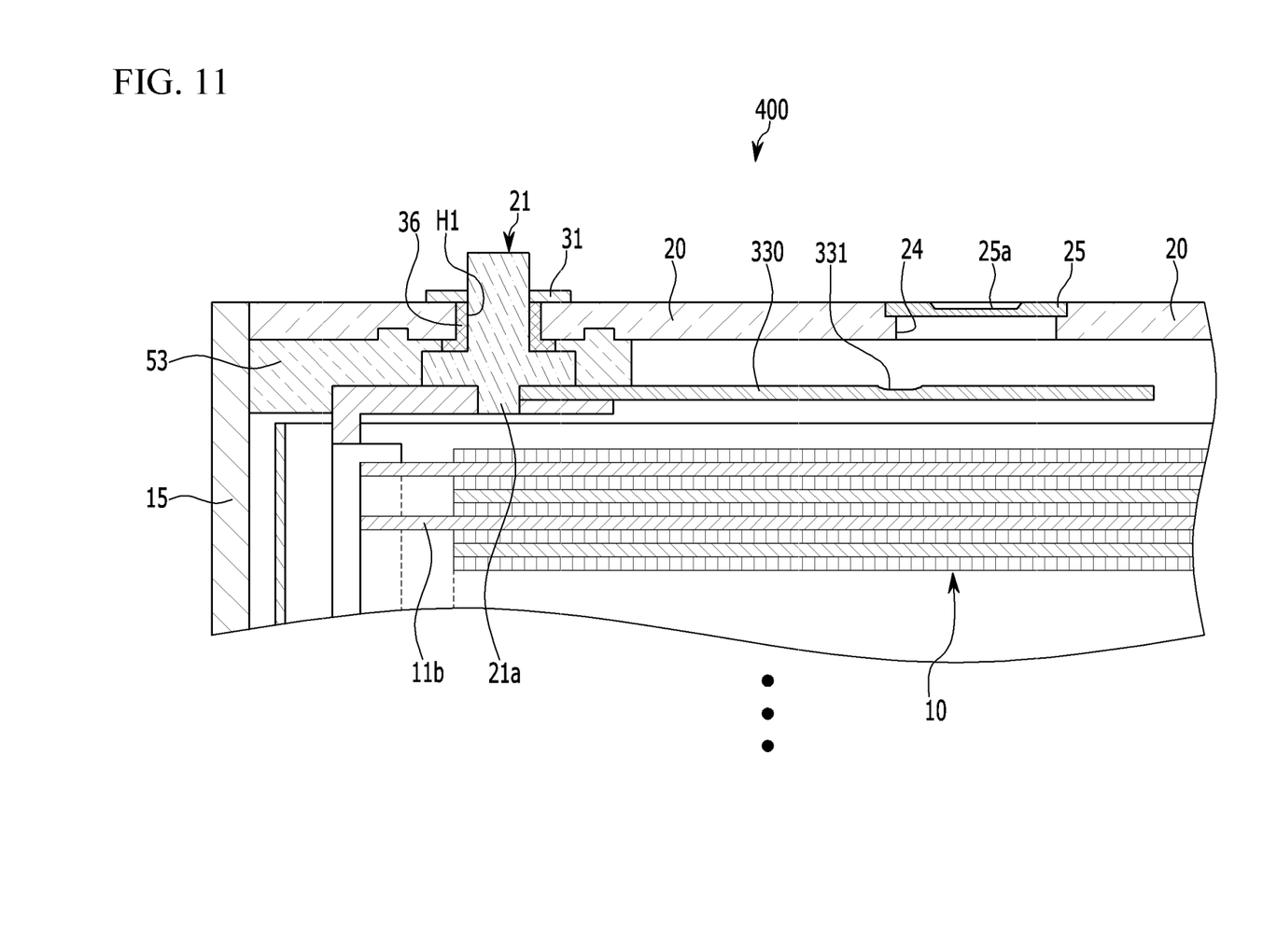
FIG. 11 is a partial cross-sectional view illustrating a rechargeable battery according to a fourth example embodiment.

FIG. 11 is a partial cross-sectional view illustrating a rechargeable battery according to a fourth example embodiment. The same reference numerals of FIGS. 1 to 10 indicate the same members with the same functions. Hereinafter, a detailed description of the same reference numerals will not be repeated.

As shown in FIG. 11, in a rechargeable battery 400 according to a fourth example embodiment, in a short circuit member 330, at a surface facing a cap plate 20, a recess portion 331 is formed.

The recess portion 331 is formed at a surface of the short circuit member 330 to more easily perform a shape change in which the short circuit member 330 is drawn outside of a vent hole 24. Therefore, in an abnormal state of an internal pressure (e.g., an internal pressure above a set pressure) of the rechargeable battery 400, the short circuit member 330 is stably drawn outside of the vent hole 24 to be short-circuited by contact with a surface of the cap plate 20.

While this disclosure has been described in connection with what are presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

| | | | |
|---|---|---|---|
| 10 | electrode assembly | 11 | negative electrode |
| 11 | negative electrode | 11b | uncoated region |
| 12 | positive electrode | 12b | uncoated region |
| 15 | case | 20 | cap plate |
| 21 | negative electrode terminal | 21a, 22a | rivet terminal |
| 22 | positive electrode terminal | 24 | vent hole |
| 25 | vent plate | 27 | seal stopper |
| 29 | electrolyte injection opening | 30 | short circuit member |
| 51 | negative electrode current collecting tab | | |
| 52 | positive electrode current collecting tab | | |
| 53, 54 | lower insulating members | 110 | insulating sheet |
| 331 | recess portion | | |

What is claimed is:

1. A rechargeable battery, comprising:
   an electrode assembly having a first electrode and a second electrode;
   an electrode terminal electrically coupled to the electrode assembly;
   a case that receives the electrode assembly;
   a cap plate at an opening of the case that closes and seals the case, the cap plate having a vent hole to discharge an internal pressure of the case and having a vent plate that closes and seals the vent hole; and
   a short circuit member having one end electrically coupled to the electrode assembly and another end that extends along a direction toward the vent hole at the inside of the case,
   wherein at least a portion of the short circuit member is configured to be drawn outside of the vent hole when the internal pressure is discharged, and
   wherein when the internal pressure is discharged, the short circuit member changes from not physically contacting the cap plate to physically contacting an outer surface of the cap plate.

2. The rechargeable battery of claim 1, wherein the short circuit member comprises a flexible material that contacts a surface of the cap plate by passing through the vent hole when the internal pressure is discharged.

3. The rechargeable battery of claim 2, wherein the short circuit member comprises a conductive material that electrically contacts the outer surface of the cap plate when the vent hole is opened.

4. The rechargeable battery of claim 3, wherein the short circuit member is at the inside of the case and has a plate shape.

5. The rechargeable battery of claim 4, wherein the short circuit member has a width that is smaller than an opened width of the vent hole.

6. The rechargeable battery of claim 4, wherein a thickness of a portion of the short circuit member that is drawn outside of the vent hole when the internal pressure is discharged is smaller than that of a portion of the short circuit member that is coupled to the electrode assembly.

7. The rechargeable battery of claim 4, wherein the short circuit member has a recess portion at a portion that contacts the vent hole when the internal pressure is discharged.

8. The rechargeable battery of claim 1, further comprising an insulating sheet attached to an internal surface of the cap plate facing the short circuit member.

* * * * *